United States Patent [19]

Strickland

[11] 4,256,175

[45] Mar. 17, 1981

[54] SOLAR FURNACE SUPPORT APPARATUS

[76] Inventor: Benjamin W. Strickland, Box 30, Joliet, Mont. 59041

[21] Appl. No.: 64,482

[22] Filed: Aug. 7, 1979

[51] Int. Cl.³ ............................................. F28F 9/00
[52] U.S. Cl. ................................... 165/67; 126/424; 126/451; 248/140; 248/397; 250/491
[58] Field of Search .......................... 165/67, 68, 80; 126/417, 424, 425, 450, 451; 248/140, 397, 185; 250/491

[56] References Cited

U.S. PATENT DOCUMENTS

| 715,018 | 12/1902 | Campbell | 248/140 |
|---|---|---|---|
| 891,479 | 6/1908 | Howe | 248/185 |
| 1,000,840 | 8/1911 | Pennington | 248/185 |
| 1,479,923 | 1/1924 | Moreau | 126/424 |
| 2,398,715 | 4/1946 | Mitchell | 248/140 |
| 2,945,417 | 7/1960 | Caryl et al. | 126/424 |
| 3,009,391 | 11/1961 | Zagieboylo et al. | 126/451 |
| 3,236,483 | 2/1966 | House | 248/140 |
| 4,063,543 | 12/1977 | Hedger | 126/425 |
| 4,108,154 | 8/1978 | Nelson | 248/397 |
| 4,122,827 | 10/1978 | Rhodes | 126/424 |

Primary Examiner—James C. Yeung
Assistant Examiner—Daniel O'Connor
Attorney, Agent, or Firm—Arthur L. Urban

[57] ABSTRACT

Solar furnace support apparatus including frame member, furnace holding member and actuating mechanism, the frame member including a base portion and an upstanding portion; the furnace holding member being pivotally carried by the frame member, the furnace holding member including spaced longitudinal members, cross members connecting the longitudinal members adjacent the ends thereof, shaft mechanism disposed adjacent the center of the longitudinal members and disposed adjacent connection of the cross members with the longitudinal members, the shaft mechanism being engageable with releasable locking members disposed on the frame member adjacent the top of the upstanding portion and adjacent the base portion thereof, actuating mechanism for moving the furnace holding member, the actuating mechanism including cooperating mechanism operatively connected to at least one of the longitudinal members at points along the length thereof substantially equidistant from the center.

9 Claims, 5 Drawing Figures

SOLAR FURNACE SUPPORT APPARATUS

This invention relates to a novel support apparatus for solar equipment and more particularly relates to a new apparatus for supporting solar furnaces.

With the recent large increases in the cost of conventional energy sources such as electricity, petroleum and coal, both in the United States and foreign countries, a great deal of attention is being given to alternative energy sources. One energy source which is especially appealing is solar energy because of its unlimited supply and the absence of pollution and other ecological problems therewith.

A number of different solar energy systems have been proposed heretofore. Generally, these systems have involved the absorption of the heat from the sun by gases or liquids and the circulation thereof to areas requiring heat. If all the heat collected by the system is not needed when the sun is shining, the heated gases or liquids can be circulated to storage chambers where the heated fluid is stored. Also, the fluid is circulated through a heat absorbing material, such as a bed of rocks which will absorb and store the heat energy for future recovery.

Since solar energy itself is free, the principal costs of solar energy systems are the initial expenditures for the solar energy converting equipment and the subsequent expense of operating and maintaining the equipment. Ideally, it is desirable to increase the temperature of the gas or liquid as much as possible during each passage of the fluid through the equipment so that a minimum size of equipment will be required to accomplish the desired absorption of heat. Thus, improving the operating efficiency of a solar energy conversion system can result in a significant savings both in capital investment and in operating costs.

Much effort has been expended on ways to improve the efficiency of solar energy systems. One area of needed improvement is the design of the actual physical structures utilized. Generally, it has been found that the more complex is the system, the greater the energy recovery. However, since the costs ordinarily increase with the complexity of the systems, the cost per unit of energy recovered still is relatively high. Because the costs of solar energy systems to date has been quite large, the costs exceed the available resources of the ordinary individual. Thus, the government has offered tax credits and other incentives to increase the acceptance and use of solar energy systems. However, there has been criticism of such incentives since they in effect provide an advantage to one part of the population at the expense of other tax payers.

The present invention provides a novel solar furnace support apparatus having advantages and features not present with systems currently available. The solar furnace support apparatus of the invention is simple in design and relatively inexpensive to manufacture. The support apparatus can be fabricated from commercially available components and materials. Also, conventional metal working fabrication techniques and procedures may be utilized in its manufacture.

The solar furnace support apparatus of the invention is of a design which facilitates partial fabrication at the manufacturing location with final erection taking place at the job site. Moreover, the erection of the apparatus may be accomplished without special tools. Furthermore, the design of the solar furnace support apparatus facilitates installation of furnaces individually or in groups as unitary structures. Thus, the apparatus of the invention provides a convenient means for generating energy both in limited quantities and also where large amounts of energy are required.

Other benefits and advantages of the novel solar furnace support apparatus of the present invention will be apparent from the following description and the accompanying drawings in which:

FIG. 3 is a top view of the solar furnace support apparatus shown in FIGS. 1 and 2.

Figure 1:
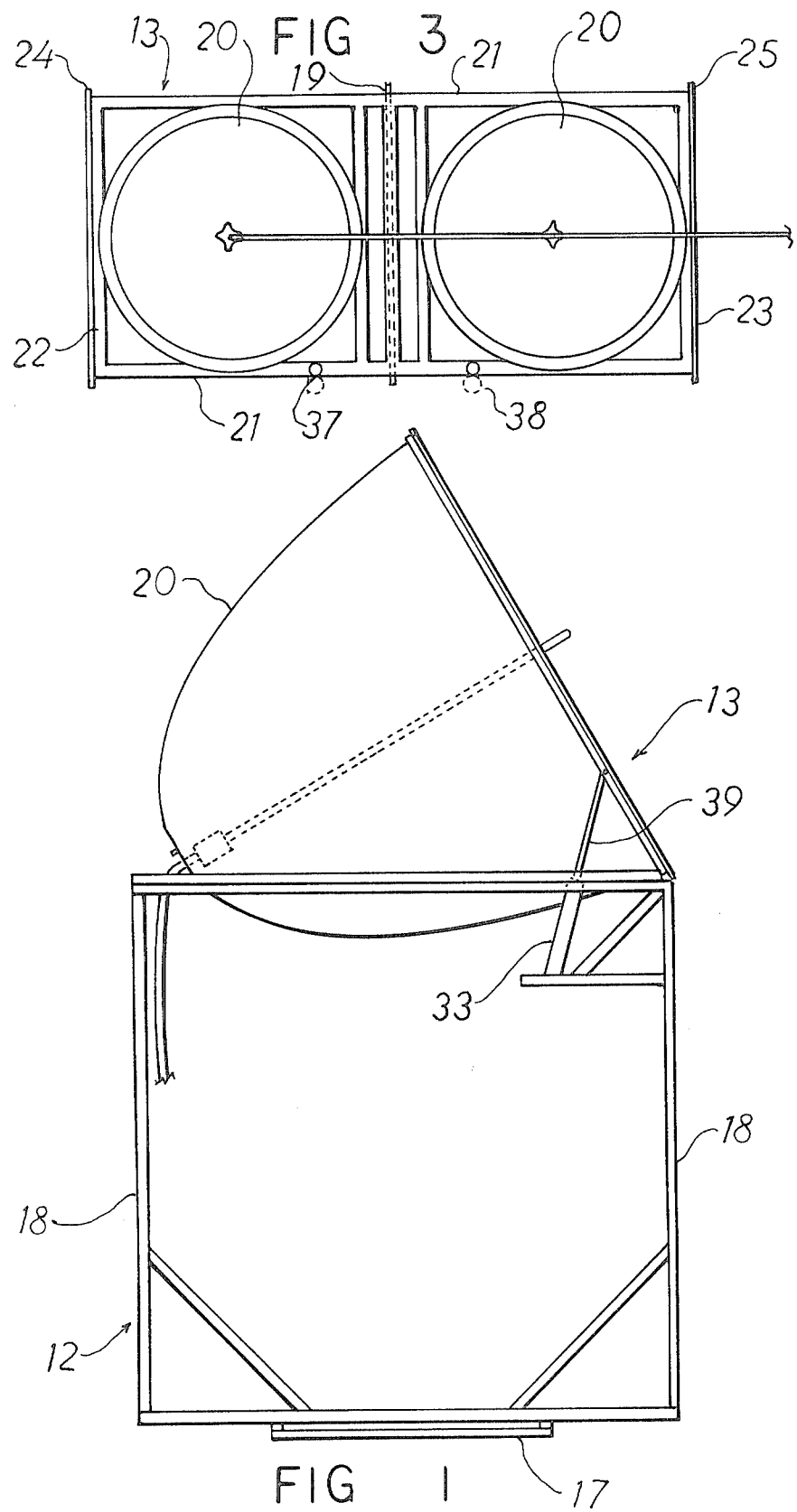
FIG. 1 is an end view of one form of the solar furnace support apparatus of the invention.

As shown in the drawings, one form of the noval solar furnace support apparatus of the present invention includes frame means 12, furnace holding means 13 and actuating means 14. Advantageously, the apparatus is supported on a center support 15 which preferably provides for rotation of the apparatus.

The frame means 12 includes a base portion 17 and an upstanding portion 18. The upstanding portion advantageously includes frame sections which preferably are disposed in an A-frame configuration.

The furnace holding means 13 is pivotally carried by frame means 12. The furnace holding means 13 includes spaced longitudinal members 21 and cross members 22 and 23 connecting the longitudinal members adjacent the ends thereof. The longitudinal members 21 and the cross members 22 and 23 form a framework for two solar furnaces represented as circles and semicircles 20 in the drawings. The furnaces 20 are mounted on the holding means 13 and two furnaces and the framework move as a single unit.

Figure 2:
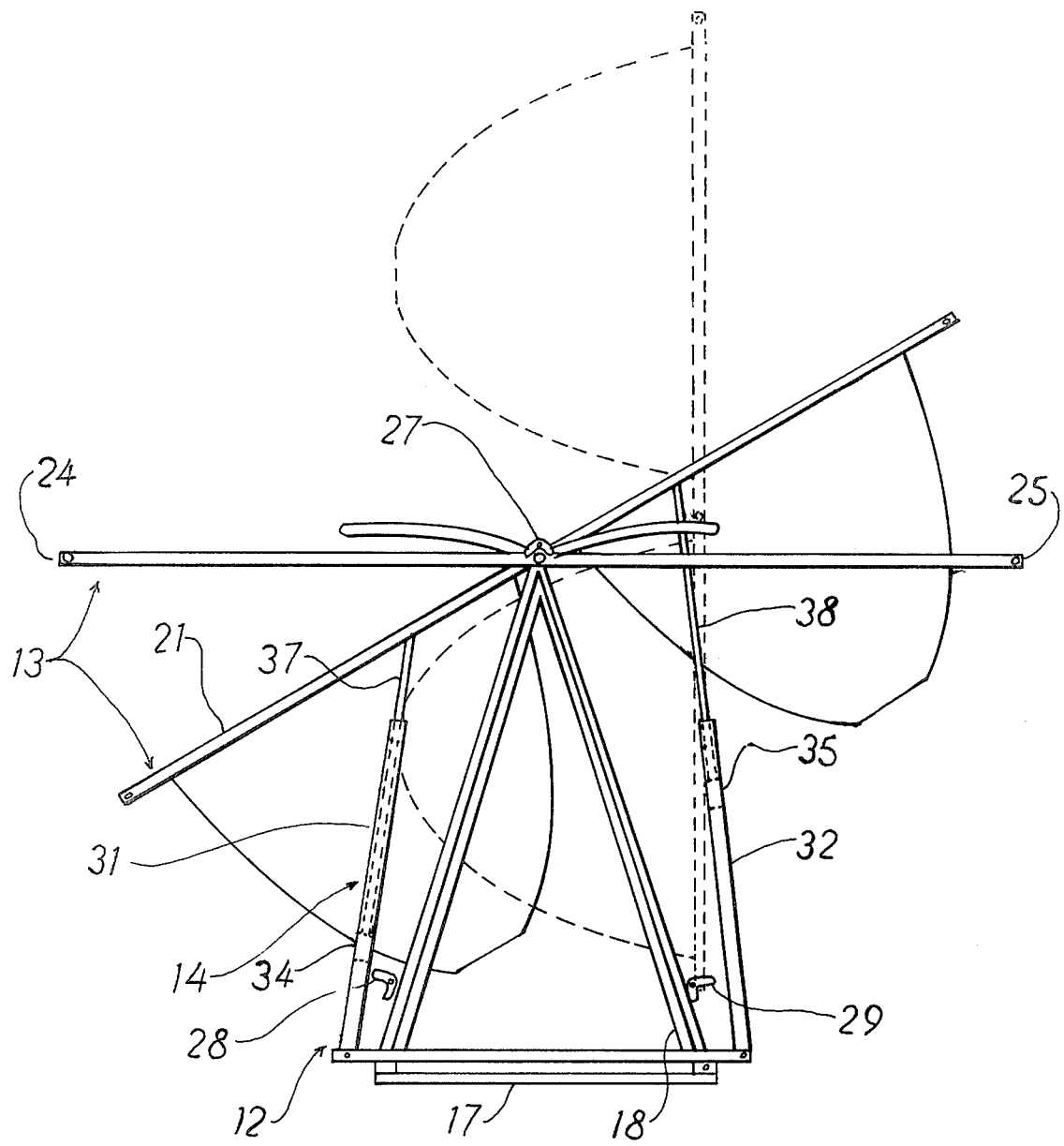
FIG. 2 is a side view of the solar furnace support apparatus shown in FIG. 1.
Figure 2A:
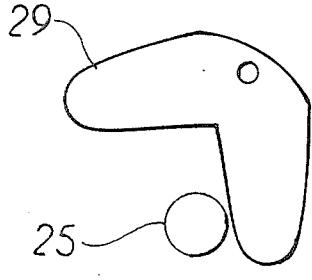
FIGS. 2A and 2B are fragmentary views of the locking portion of the solar furnace support apparatus shown in FIG. 1.
Figure 2B:
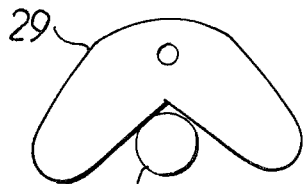

The furnace holding means 13 as pointed out above is pivotally carried by the frame means 12. As shown, the furnace holding means includes a central shaft 19 and end shafts 24 and 25 disposed on cross members 22 and 23. Shafts 24 and 25 are engageable with releasable locking means 27, 28 and 29 respectively of the frame 12 as shown in FIG. 2. The locks are disposed on the frame 12 with the lock 27 at the apex of the frame and engageable with shaft 19. Locks 28 and 29 are located adjacent the base portion 17 of the frame and are engageable with shafts 24 and 25 respectively. The locking means 27, 28 and 29 advantageously are self releasable as shown in FIGS. 2A and 2B.

Actuating means 14 for moving the furnace holding means 13 includes cooperating means operatively connected to the furnace holding means 13 at points substantially equidistant from the center thereof. As shown in the drawings, the cooperating means include cooperating cylinders 31, 32 and 33 and pistons 34, 35 and 36. The pistons have rods 37, 38 and 39 which facilitate the application of force from the pistons to the furnace holding means 13.

Cylinders 31 and 32 advantageously have their lower ends fastened adjacent the base portion 17 of the frame means 12 and extend upwardly therefrom. The upper ends of piston rods 37 and 38 are releasably engageable with longitudinal section 21 so that the cylinders 31 and 32 selectively can provide full rotational movement of the furnace holding means 13. Cylinder 33 provides arcuate movement of the frame means 12 in another plane. Advantageously, cylinder 33 is disposed along the center line of the furnace holding means 13.

In the operation of the solar furnace support apparatus of the invention as shown in the drawings, solar furnaces 20 are mounted in the furnace holding means 13 formed by longitudinal members 21 and cross members 22 and 23. The furnaces are oriented with their openings facing in the same direction. The furnaces may be secured to the framework by suitable brackets and fasteners (not shown).

The furnace holding means 13 is oriented to face toward the sun by actuating cylinders 31, 32 and 33. Cylinder 33 provides for the inclination of the furnaces to compensate for the seasonal changes in the location of the sun. Thus, cylinder 33 changes the position of the furnace holding means 13 only slightly each day. Cylinders 31 and 32 cooperate to provide the required movement of the furnace holding means 13 from morning to night. As shown in FIG. 2, the dotted line drawing to the right of center represents the position of the furnace holding means 13 early in the morning when the sun is close to the horizon. The solid line drawing of furnace holding means 13 (without furnaces) represents the position thereof at noon or in a locked position. The solid line representation of the furnace holding means 13 with furnaces 20 inclined to the left in FIG. 2 illustrates an afternoon position.

Movement of the furnaces 20 is achieved in accordance with the apparatus of the present invention shown in the drawings through the selective and cooperating action of cylinders 31 and 32. To attain the early morning position of the furnace holding means, the end of piston rod 38 is disengaged from furnace holder 13 so that the right end of the furnace holder is free to swing down to allow shaft 25 to engage lock 29. The furnace holder 13 is maintained in an upright position through cylinder 31 and the piston 34 thereof being in an extended position and rod 37 being pivotally engaged with the furnace holder. As shown, the piston rod 37 engages the furnace holder 13 at a point displaced above the center of the longitudinal member 21.

As the sun rises in the sky, piston 34 is drawn into cylinder 31 pulling the free end of the furnace holder to the left as shown in FIG. 2. Movement of furnace holder 13 continues until shaft 19 thereof contacts and engages lock 27 at the apex of the frame means 12. Simultaneously, shaft 25 will be released from lock 29 so that the furnace holder 13 can continue its rotation about shaft 19 until the noon position is reached. At that point, the end of piston rod 38 will engage furnace holder 13 and rod 37 will be disengaged therefrom. This engagement of the piston rods may be effected through known mechanisms such as mechanical or magnetic locks and linkages (not shown). As the day progresses and the position of the sun changes in the sky, cylinder 32, piston 35 and rod 38 push the right side of furnace holder 13 upwardly until shaft 24 at the left side thereof engages lock 28. Then lock 27 releases shaft 19 and the furnace holder 13 can be rotated by cylinder 32 toward a vertical position for alignment with the late afternoon sun.

The solar furnaces may be connected to a fluid circulating heating system (not shown) for heating one or more dwellings, businesses, etc.

The above description and the accompanying drawings show that the present invention provides a novel solar furnace support apparatus which is simple in design and relatively inexpensive to manufacture. The solar furnace support apparatus of the invention can be fabricated from commercially available components and materials. Conventional metal working manufacturing techniques can be utilized in the fabrication of the apparatus.

The solar furnace support apparatus of the invention is of a design which enables the apparatus to be fabricated partially at the manufacturing location if desired with the completion of the erection taking place at the job site. The erection of the apparatus may be accomplished by semi-skilled labor with a minimum of instruction and without special tools. The design of the solar furnace support apparatus is adaptable to groups of solar furnaces as well as individual or pairs of units. As a result, the support apparatus of the invention provides a convenient means for generating limited quantities of energy such as for a single dwelling as well as larger quantities of energy for business, apartments, groups of dwellings and the like.

It will be apparent that various modifications can be made in the particular solar furnace support apparatus described in detail above and shown in the drawings within the scope of the invention. For example, the size and configuration of the components can be changed to meet specific requirements. The structural members utilized in the fabrication of the support apparatus may be round or square tubing, flat or angle members and the like. Also, bracing members may be added to provide the desired or required rigidity to the structure. Therefore, the scope of the invention is to be limited only by the following claims.

What is claimed is:

1. A solar furnace support apparatus including frame means, furnace holding means and actuating means, said frame means including a base portion and an upstanding portion; said furnace holding means being pivotally carried by said frame means, said furnace holding means including spaced longitudinal members, cross members connecting said longitudinal members adjacent the ends thereof, shaft means disposed adjacent the center of said longitudinal members and disposed adjacent the connection of said cross members with said longitudinal members, said shaft means being engageable with releasable locking means disposed on said frame means adjacent the top of said upstanding portion and adjacent the base portion thereof, actuating means for moving said furnace holding means, said actuating means including cooperating means operatively connected to at least one of said longitudinal members at points along the length thereof substantially equidistant from the center.

2. A solar furnace support apparatus according to claim 1 wherein said upstanding portion of said frame means includes A-frame sections.

3. A solar furnace support apparatus according to claim 1 wherein said furnace holding means is of a generally rectangular configuration.

4. A solar furnace support apparatus according to claim 1 wherein said actuating means includes cooperating cylinders and pistons.

5. A solar furnace support apparatus according to claim 1 wherein said furnace holding means is capable of holding two furnaces.

6. A solar furnace support apparatus according to claim 1 wherein said locking means are self releasable.

7. A solar furnace support apparatus according to claim 4 wherein said cylinders and pistons are fastened adjacent the base portion of said frame means.

8. A solar furnace support apparatus according to claim 1 including second actuating means.

9. A solar furnace support apparatus according to claim 8 wherein said second actuating means includes a cylinder and piston disposed along the center line of said furnace holding means.

* * * * *